US012684681B2

(12) United States Patent
Zhou et al.

(10) Patent No.: US 12,684,681 B2
(45) Date of Patent: Jul. 14, 2026

(54) TARGET GAS LOADING FOR NEUTRON GENERATOR

(71) Applicant: Halliburton Energy Services, Inc., Houston, TX (US)

(72) Inventors: Zilu Zhou, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 626 days.

(21) Appl. No.: 17/957,026

(22) Filed: Sep. 30, 2022

(65) Prior Publication Data

US 2024/0114612 A1 Apr. 4, 2024

(51) Int. Cl.
| | |
|---|---|
| *H05H 3/06* | (2006.01) |
| *G01V 5/10* | (2006.01) |
| *G21B 1/19* | (2006.01) |
| *E21B 49/00* | (2006.01) |

(52) U.S. Cl.
CPC ................. *H05H 3/06* (2013.01); *G01V 5/10* (2013.01); *G21B 1/19* (2013.01); *E21B 49/00* (2013.01)

(58) Field of Classification Search
CPC .................................. H05H 3/06; G01V 5/10
See application file for complete search history.

(56) References Cited

U.S. PATENT DOCUMENTS

| | | | | | |
|---|---|---|---|---|---|
| 3,141,975 | A | * | 7/1964 | Carr | H01J 41/20 |
| | | | | | 376/151 |
| 3,461,291 | A | * | 8/1969 | Goodman | G01V 5/108 |
| | | | | | 250/269.2 |
| 3,569,756 | A | * | 3/1971 | Reifenschweiler ... | H01J 49/105 |
| | | | | | 313/363.1 |
| 3,581,093 | A | * | 5/1971 | Carr | H05H 3/06 |
| | | | | | 376/116 |
| 4,996,017 | A | * | 2/1991 | Ethridge | H05H 3/06 |
| | | | | | 376/116 |
| 5,293,410 | A | * | 3/1994 | Chen | H05H 3/06 |
| | | | | | 376/114 |
| 8,642,944 | B2 | * | 2/2014 | Saenger | G01T 3/08 |
| | | | | | 250/269.4 |

(Continued)

OTHER PUBLICATIONS

Navarro, Juan, and Weijun Guo. "High-efficiency, high-yield pulsed neutron generators for the well logging industry." SPE Annual Technical Conference and Exhibition. SPE, 2016. (Year: 2016).*

(Continued)

*Primary Examiner* — Lily C Garner
(74) *Attorney, Agent, or Firm* — Conley Rose, P.C.; Rodney B. Carroll

(57) ABSTRACT

A method includes operating a neutron generator in a loading mode by ionizing ionizable gas within an ion source of the neutron generator to create a plurality of ions, and accelerating the plurality of ions by providing a first voltage to a target rod that supports the target to create a first ion beam that bombards a target of the neutron generator. The method also includes operating the neutron generator in a generating mode to generate a plurality of neutrons by accelerating the plurality of ions by providing a second voltage to the target rod to create a second ion beam that bombards the target. The second voltage is greater than the first voltage.

20 Claims, 8 Drawing Sheets

(56) References Cited

U.S. PATENT DOCUMENTS

| | | | | |
|---|---|---|---|---|
| 9,001,956 | B2 * | 4/2015 | Groves | G01V 5/10 376/114 |
| 9,155,185 | B2 * | 10/2015 | Reijonen | H01J 35/16 |
| 9,217,793 | B2 * | 12/2015 | Zhou | G01T 1/185 |
| 9,230,772 | B2 * | 1/2016 | Zhou | H01J 1/3044 |
| 9,793,084 | B2 * | 10/2017 | Reijonen | H01J 35/04 |
| 9,915,753 | B2 * | 3/2018 | Hiles | E21B 49/00 |
| 10,288,763 | B2 * | 5/2019 | Navarro-Sorroche ... | G01V 5/10 |
| 10,502,861 | B2 * | 12/2019 | Navarro-Sorroche ... | G01V 5/10 |
| 11,558,037 | B2 * | 1/2023 | Hanington | H03K 3/57 |
| 2001/0019601 | A1 * | 9/2001 | Tkahashi | H01J 35/065 378/114 |
| 2003/0184235 | A1 * | 10/2003 | Nakamura | H01J 37/32009 315/111.21 |
| 2009/0135982 | A1 * | 5/2009 | Groves | H05H 3/06 376/113 |
| 2009/0219028 | A1 * | 9/2009 | Perkins | G01V 5/10 324/333 |
| 2013/0256522 | A1 * | 10/2013 | Perkins | H05H 3/06 250/269.4 |
| 2016/0320520 | A1 * | 11/2016 | Hiles | E21B 49/00 |
| 2018/0246249 | A1 * | 8/2018 | Navarro-Sorroche | E21B 49/00 |
| 2022/0190810 | A1 * | 6/2022 | Hanington | H05G 1/20 |
| 2023/0380046 | A1 * | 11/2023 | Zhou | H01J 27/205 |
| 2025/0176091 | A1 * | 5/2025 | Zhou | H01J 27/205 |

OTHER PUBLICATIONS

Ellis, Darwin V. et al., "Well Logging for Earth Scientists: Second Edition," 2007, 699 pages, Springer Science +Business Media B.V.
Csikai, Julius, "CRC Handbook of Fast Neutron Generators," 1987, 3 pages, CRC Press, Inc.

Reifenschweiler O., "Sealed-Off Neutron Tube: the Underlying Research Work," Philips Research Reports, Oct. 1961, vol. 435, No. 16, pp. 401-418, The Research Laboratory of N.V. Philips Gloeilampenfabrieken, Eindhoven, Netherlands.
"Multifunction LWD Service," EcoScope, 2017, 3 pages, Schlumberger.
"Litho Scanner: High-definition spectroscopy service," 2017, 20 pages, Schlumberger.
"Pulsar: Multifunction Spectroscopy Service," 2019, 2 pages, Schlumberger.
"RMT-3D™ 2⅛-in. Reservoir Monitor Tool for Oil, Water, and Gas Saturations," Halliburton Wireline & Perforating, 2019, 2 pages, Halliburton.
Chen, Jianxing, "A New Cased-Hole 2-⅛ in. Multi-Detector Pulsed-Neutron Tool: Theory and Characterization," Jul. 18-22, 2015, 11 pages, Spwla 56th Annual Logging Symposium.
Zhou, Zilu, "A Scandium Target for a Neutron Generator for Wellbore Logging," 23 pages.
Lindsay, B.G. et al., "Charge transfer cross sections for energetic neutral atom data analysis," Journal of Geophysical Research, Jul. 3, 2005, vol. 110, No. A12213, 10 pages, American Geophysical Union.
Ziegler, James et al., "SRIM—The Stopping and Range of Ions in Matter," Nuclear Instruments and Methods in Physics Research B, 2010, vol. 268, pp. 1818-1823, Elsevier.
Berger, M.J. et al., "Stopping-Power & Range Tables for Electrons, Protons, and Helium Ions," National Institute of Standards and Technology, Oct. 7, 2009, 3 pages, U.S. Department of Commerce.
Foreign Communication from Related Application—International Search Report and Written Opinion of the International Searching Authority, International Application No. PCT/US2021/021929, dated Jul. 8, 2021, 10 pages.
Filing Receipt, Specification and Drawings for U.S. Appl. No. 17/731,559, entitled "Scandium Target for a Neutron Generator for Wellbore Logging ," filed Apr. 28, 2022, 26 pages.

* cited by examiner

800 ⁓

TARGET GAS LOADING FOR NEUTRON GENERATOR

TECHNICAL FIELD

The present disclosure relates generally to neutron generators, for example as logging tools in a subterranean region. More specifically, this disclosure relates to a method and apparatus for loading a target of a neutron generator.

BACKGROUND

In some cases, wells are drilled to access and produce hydrocarbons, such as oil and gas, from subterranean geological formations. Wellbore operations may include drilling operations, completion operations, fracturing operations, and production operations. Drilling operations in particular may include gathering information (e.g., logging) related to downhole geological formations of the wellbore. In the field of logging (e.g., wireline logging, logging while drilling (LWD) and measurement while drilling (MWD)), a logging tool may include a neutron generator, which is useful to collect information about the subsurface, particularly at relatively higher temperatures.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
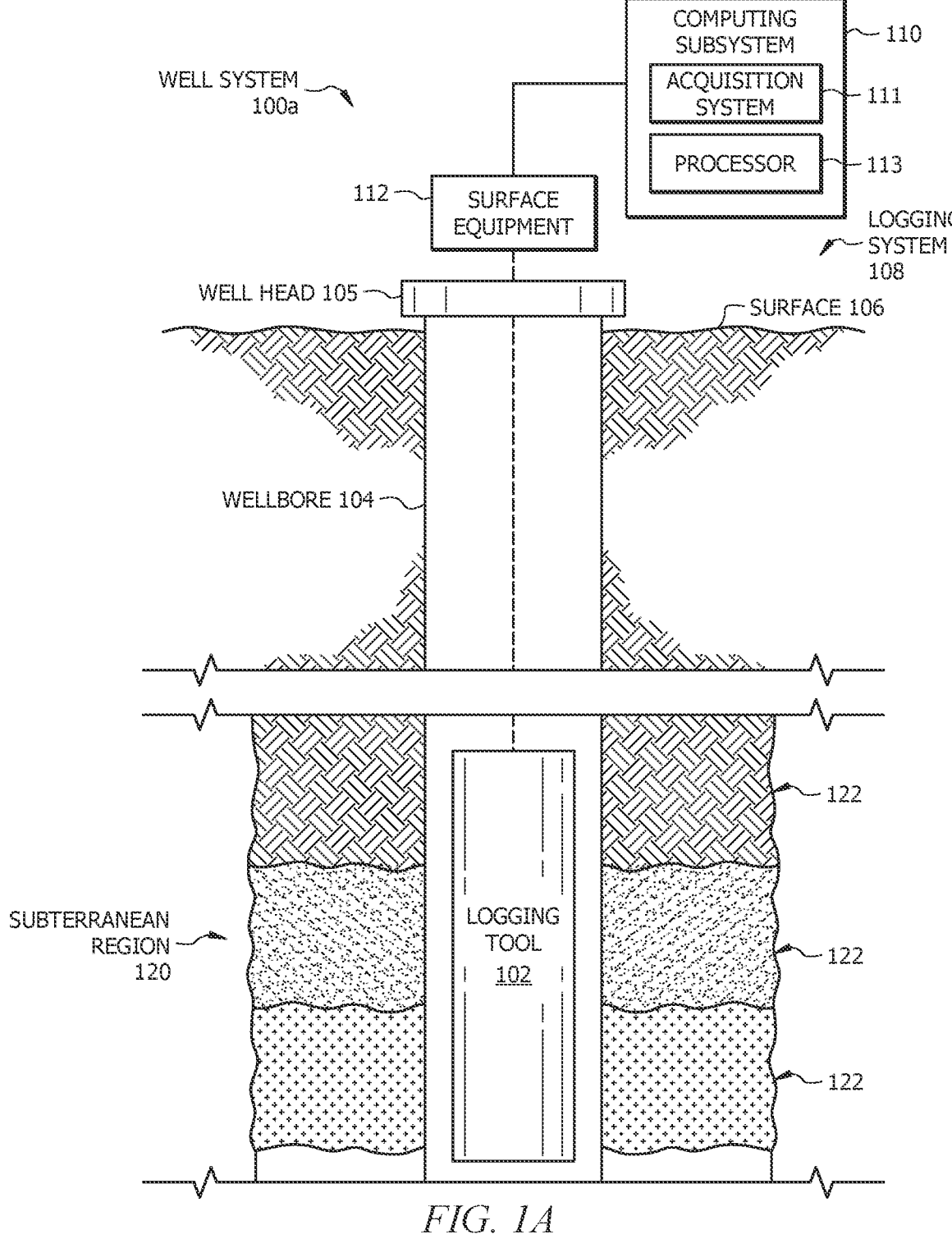
FIG. 1A is a diagram of an example well system.

It should be understood at the outset that although an illustrative implementation of one or more examples are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Neutron generators are useful in downhole nuclear logging tools for various oil and/or gas well measurements, such as in elevated temperature downhole environments. Unless specifically noted, examples of this disclosure are not limited to a particular type of logging tool, other than logging tools that generally utilize a neutron generator as a source of neutrons, such as to be provided to the earthen formation.

Neutron generators generate neutrons by fusing isotopes of hydrogen together. Common isotopes of hydrogen include deuterium (D) gas and tritium (T) gas. Neutron generators may be deployed as a downhole tool during wellbore operations to measure downhole geological formations in a wellbore. A target of a neutron generator may include at least one metal layer positioned on a target rod. The metal layer may be loaded with the deuterium (D) and tritium (T) gas, such that when an ion beam of deuterium and tritium ions is accelerated towards the target, neutrons are generated. The target includes a metal layer, such as a titanium layer, a zirconium layer, a scandium layer, or another metal foil layer positioned on a surface of the target rod, where the metal layer faces the ion beam. Reference may generally be made herein to the metal layer being a titanium layer for simplicity; however, examples of this disclosure should not be limited to a particular type of metal layer unless specifically noted.

The D and/or T gas is loaded into the metal foil target as described above. For example, the metal foil target is loaded with D/T gas during an initial phase of neutron generator operation, such as before the neutron generator is deployed in the field. During this initial loading, if the target is not loaded with D/T gas to saturation, a neutron yield of the target is relatively lower, which negatively impacts performance of the neutron generator (e.g., a number of neutrons generated per unit of time is relatively less, for a given ion beam accelerated by a given voltage provided to the target).

Also, during operation of the neutron generator, the neutron generator may be operated in wellbore environments having relatively higher ambient temperatures (e.g., approximately 1500 Celsius (C) or greater). Further heat is generated due to the focused ion beam bombarding the target because the target absorbs high-energy ions and dissipates the power as heat. Thus, degassing of the target is possible and varies as a function of temperature of the target, which is potentially beyond 200° C.

Accordingly, particularly in wellbore environments where the ambient temperatures are already relatively high and the target is further heated by absorbing high-energy ions, a neutron yield of the neutron generator may decrease over time as target degassing occurs. The decreased neutron yield may be compensated for by increasing the voltage applied to the target, but only to a certain level. For example, eventually the high-voltage value needed to maintain suitable neutron yield will exceed what is tolerable by other system electronic components, which may damage those other components, irreparably in some cases.

The target may be reloaded during a scheduled maintenance service, which increases the D/T gas content of the target. However, regardless of whether the target is being loaded initially, or reloaded during a maintenance service, target gas loading using a focused ion beam may result in the target not being loaded to a full saturation level of D/T gas. For example, because implementing beam controlling optics in compact neutron tubes is difficult, the ion beam is typically focused by the high-voltage voltage source that is coupled to the target rod. Accordingly, the focused ion beam typically has a circular spot with a Gaussian-like intensity distribution, in which the center of the ion beam has a higher intensity, while the outer portions of the ion beam have lower intensities that decrease to the edge of the ion beam. As a result, the target is primarily loaded in the area upon which the ion beam is incident, which results in a non-uniform loading of the target, with the target potentially being loaded to a sub-saturation level. A target that is not fully saturated (e.g., is loaded to a sub-saturation level) may result in shorter periods between maintenance, lower neutron yield, or both, which decreases the neutron generator performance while increasing the cost of operating the neutron generator.

To address the foregoing, disclosed herein are methods, assemblies, and systems that operate a neutron generator in a loading mode in order to load the target with D/T gas to a particular saturation level (e.g., fully saturated). In the loading mode, ionizable gas (e.g., D/f gas) is ionized within an ion source of the neutron generator, and the resulting ions are accelerated toward the target by providing a first voltage to a target rod that supports the target. A first ion beam of the accelerated ions thus bombards the target and begins loading the target with D/T gas. In various examples, the first ion beam is defocused relative to a second ion beam that is created in a neutron-generating mode (a "generating mode" for brevity).

In the generating mode, the resulting ions from the ion source are also accelerated toward the target, but by providing a second voltage to the target rod to create the second ion beam. The second voltage is greater than the first voltage, which causes the second ion beam of the accelerated ions to be more focused (e.g., narrower or smaller in beam spot size on target) than the first ion beam.

Because the first ion beam is relatively defocused, it may be incident on substantially all of the surface area of the target, or at least about 80% of the surface area of the target. Accordingly, the target is more evenly loaded when the neutron generator is operated in the loading mode, and thus more likely loaded to a full saturation of D/F gas. A target that is more fully saturated (e.g., is loaded to a D/T gas saturation level) may result in higher stability in operation, longer periods between maintenance, greater neutron yield, or both, which increases the neutron generator performance while decreasing the cost of operating the neutron generator.

In addition to a DC or continuous wave (CW) operation, in some examples, a neutron generator is often operated in a pulsed neutron generation mode, for applications where fast neutron inelastic scattering and delayed thermal neutron captures may be isolated in different timing windows to provide additional information for earthen formation evaluation. The neutron pulses may have durations on the order of 10 to 80 microseconds (μsec), and have an idle time between pulses on the order of 50 to 1000 μsec, depending on the application. This may reduce the operating duty factor of neutron generator down to 20% or lower. Examples described here may be applicable to either CW or pulsed applications; however, examples of this disclosure should not be limited to a particular type of application unless specifically noted. These and other examples are described in further detail below, and with reference to the accompanying figures.

FIG. 1A is a diagram of an example well system 100a. The example well system 100a includes a logging system 108 and a subterranean region 120 beneath the ground surface 106. A well system may include additional or different features that are not shown in FIG. 1A. For example, the well system 100a may include additional drilling system components, wireline logging system components, etc.

The subterranean region 120 may include all or part of one or more subterranean formations or zones. The example subterranean region 120 shown in FIG. 1A includes multiple subsurface layers 122 and a wellbore 104 penetrated through the subsurface layers 122. The subsurface layers 122 may include sedimentary layers, rock layers, sand layers, or combinations of these and other types of subsurface layers. One or more of the subsurface layers may contain fluids, such as brine, oil, gas, etc. Although the example wellbore 104 shown in FIG. 1A is a vertical wellbore, the logging system 108 may be implemented in other wellbore orientations. For example, the logging system 108 may be adapted for horizontal wellbores, slanted wellbores, curved wellbores, vertical wellbores, or combinations thereof.

The example logging system 108 includes a logging tool 102, surface equipment 112, and a computing subsystem 110. In the examples described herein, the logging tool 102 is a nuclear logging tool 102 that includes a neutron generator and one or more sensors for determining information about the wellbore 104. The neutron generator is not specifically shown in FIGS. 1A-1C for simplicity, but is described in further detail below. In the example shown in FIG. 1A, the logging tool 102 is a downhole logging tool that operates while disposed in the wellbore 104. The example surface equipment 112 shown in FIG. 1A operates at or above the surface 106, such as near the wellhead 105, to control the logging tool 102, and possibly to control other downhole equipment or other components of the well system 100. The example computing subsystem 110 is configured to receive and analyze nuclear logging data from the logging tool 102, such as described below in further detail. For example, the computing subsystem 110 may include at least an acquisition system III to acquire or receive data (e.g., from the logging tool 102) and a processor 113 to process the acquired or received data. The logging system 108 may include additional or different features, and the features of the logging system 108 may be arranged and operated as represented in FIG. 1A or in another manner.

In some instances, all or part of the computing subsystem 110 may be implemented as a component of, or may be integrated with one or more components of the surface equipment 112, the logging tool 102 or both. In some cases, the computing subsystem 110 may be implemented as one or more computing structures separate from the surface equipment 112 and the logging tool 102.

In some implementations, the computing subsystem 110 is embedded in the logging tool 102, and the computing subsystem 110 and the logging tool 102 are configured to operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102, or integrated to the logging tool 102.

The well system 100a may include communication or telemetry equipment that enables communication among the computing subsystem 110, the logging tool 102, and other components of the logging system 108. For example, the components of the logging system 108 may each include one or more transceivers or similar apparatus for wired or wireless data communication among the various components. For example, the logging system 108 may include systems and apparatus for optical telemetry, wireline telemetry, wired pipe telemetry, mud pulse telemetry, acoustic telemetry, electromagnetic telemetry, or a combination of these and other types of telemetry. In some cases, the logging tool 102 is configured to receive commands, status signals, or other types of information from the computing subsystem 110 or another source. In some cases, the computing subsystem 110 receives nuclear logging data, status signals, or other types of information from the logging tool 102 or another source.

The computing subsystem 110 may include a program memory that is configured to store executable instructions of one or more software programs corresponding to the functions described herein. The program memory may physically reside within computing subsystem 110 or at other computing resources accessible to computing subsystem 110, such as within the local memory resources of other memory devices and storage devices coupled to the computing subsystem 110, or within a server or other network-accessible memory resources accessible by the computing subsystem 110, or distributed among multiple locations. In any case, this program memory constitutes a non-transitory computer-readable medium that stores executable computer program instructions, according to which the operations described in this specification are carried out by computing subsystem 110, or by a server or other computer coupled to computing subsystem 110 (e.g., via network interfaces). The computer-executable software instructions corresponding to software programs to perform the functions described herein may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by computing subsystem 110 in the conventional manner for software installation. It is contemplated that those skilled in the art will be readily able to implement the storage and retrieval of the applicable data, program instructions, and other information useful in connection with this example, in a suitable manner for each particular application, without undue experimentation.

In examples of this disclosure, nuclear logging operations may be performed in connection with various types of downhole operations at various stages in the lifetime of a well system. Structural attributes and components of the surface equipment 112 and logging tool 102 may be adapted for various types of nuclear logging operations. For example, nuclear logging may be performed during drilling operations, during wireline logging operations, or in other contexts. Accordingly, the surface equipment 112 and the logging tool 102 may include, or may operate in connection with drilling equipment, wireline logging equipment, or other equipment for other types of operations. As another example, nuclear logging may be performed in an offshore or subsea environment. Accordingly, the surface equipment 112 may be arranged on a drill ship or other offshore drilling vessel, and the logging tool 102 operates in connection with offshore drilling equipment, offshore wireline logging equipment, or other equipment for use with offshore operations.

Figure 1B:
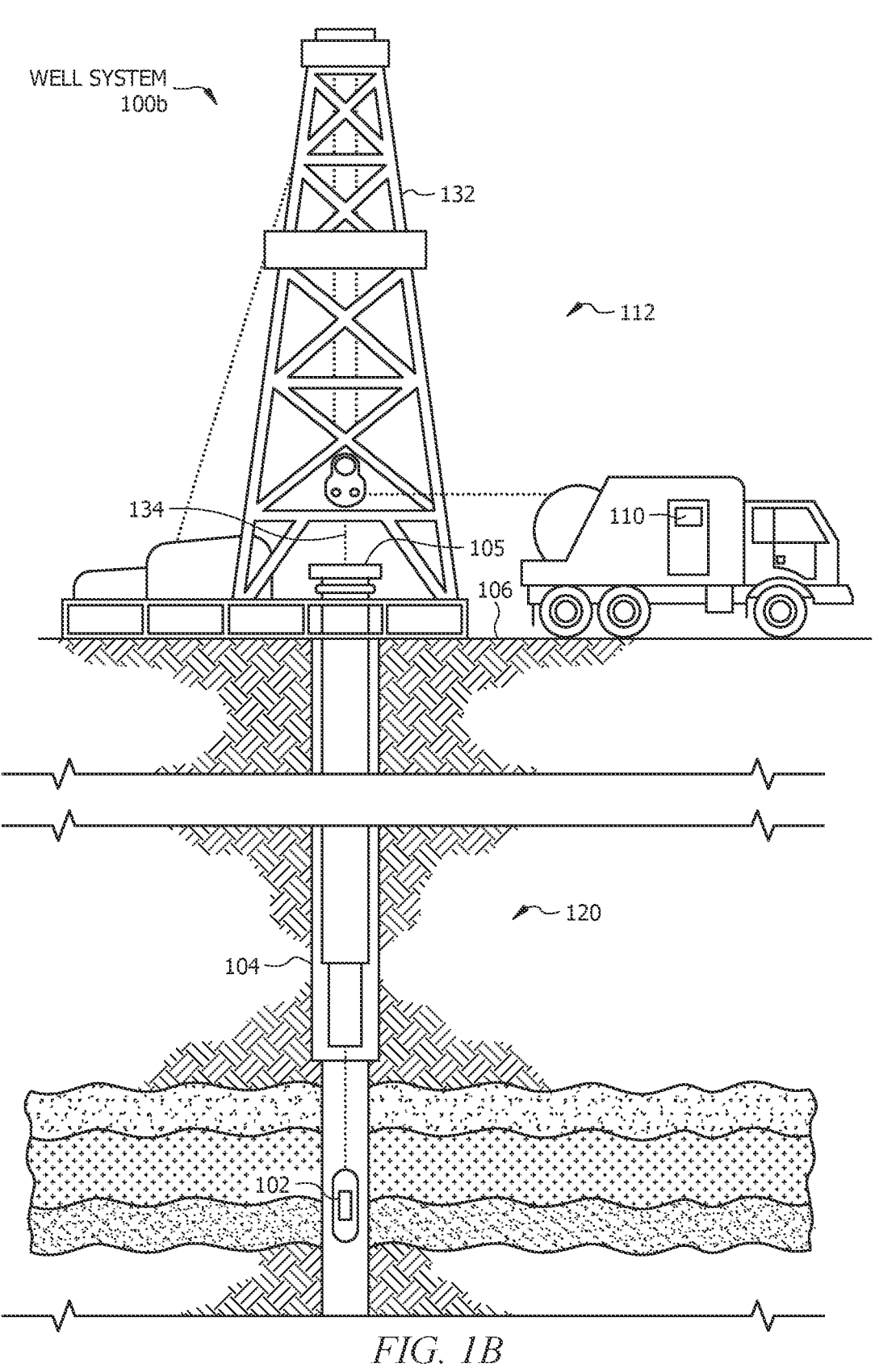
FIG. 1B is a diagram of an example well system that includes a neutron generator in a wireline logging environment.

In some examples, nuclear logging operations are performed during wireline logging operations. FIG. 1B shows an example well system 100b that includes the logging tool 102 in a wireline logging environment. In some example wireline logging operations, the surface equipment 112 includes a platform above the surface 106 equipped with a derrick 132 that supports a wireline cable 134 that extends into the wellbore 104. Wireline logging operations may be performed, for example, after a drill string is removed from the wellbore 104, to allow the wireline logging tool 102 to be lowered by wireline or logging cable into the wellbore 104.

Figure 1C:
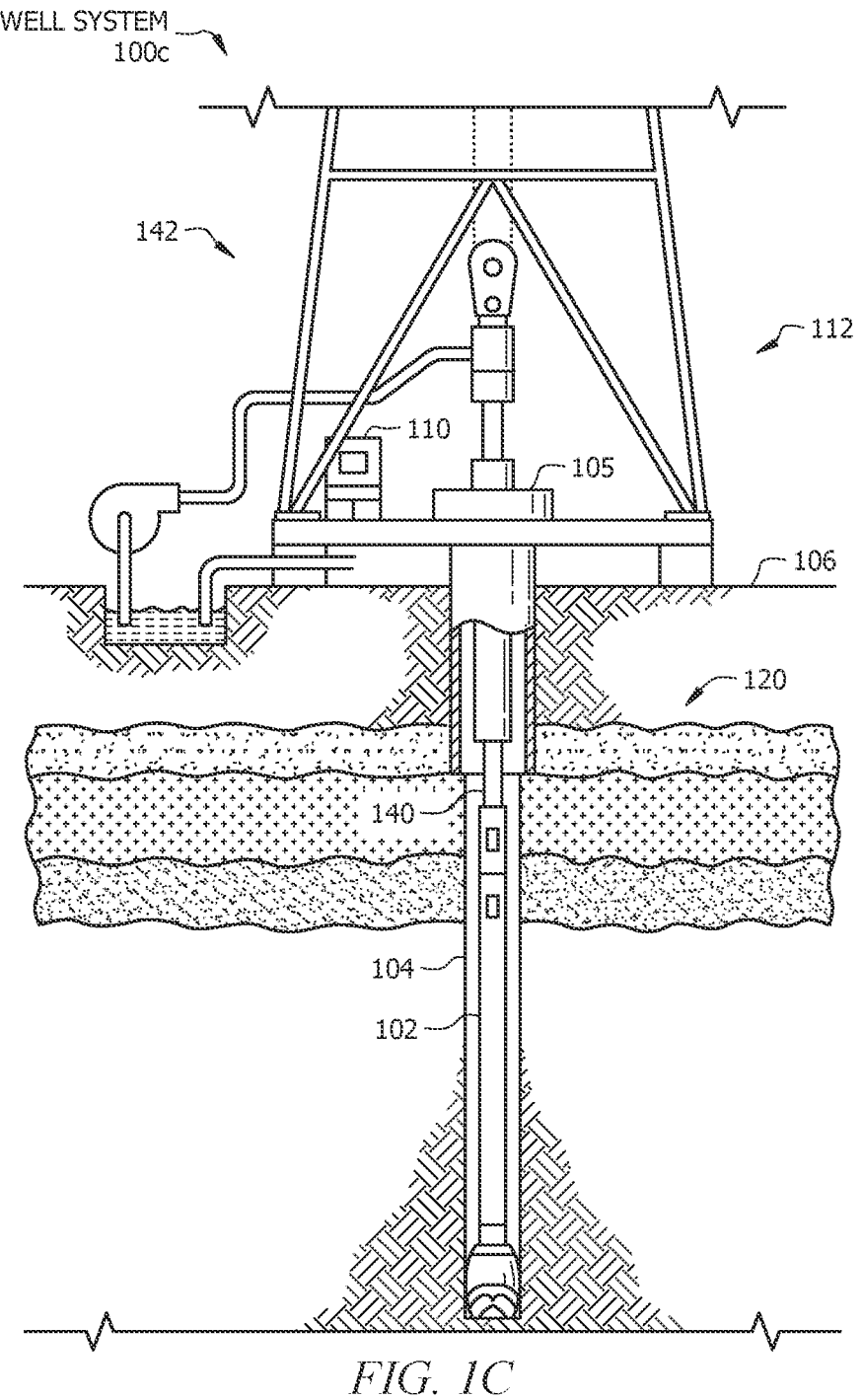
FIG. 1C is a diagram of an example well system that includes a neutron generator in an LWD environment.

In some examples, nuclear logging operations are performed during drilling operations. FIG. 1C shows an example well system 100c that includes the logging tool 102 in a LWD/MWD environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string 140 may include, for example, a kelly, drill pipe, a bottomhole assembly, and other components. The bottomhole assembly on the drill string may include drill collars, drill bits, the logging tool 102, and other components, including additional logging tools 102. The additional logging tools 102 may include MWD tools, LWD tools, and others.

In some implementations, the logging tool 102 is configured to obtain nuclear measurements from the subterranean region 120. As shown, for example, in FIG. 1B, the logging tool 102 may be suspended in the well bore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 may be deployed in the wellbore 104 on jointed drill pipe, hard wired drill pipe, or other deployment hardware. In some example implementations, the logging tool 102 collects data during drilling operations as it moves downward through the region of interest. In some example implementations, the logging tool 102 collects data while the drill string 140 is moving, for example, while it is being tripped in or tripped out of the wellbore 104.

In some implementations, the logging tool 102 collects data at discrete logging points in the wellbore 104. For example, the logging tool 102 may move upward or downward incrementally to each logging point at a series of depths in the wellbore 104. At each logging point, instruments in the logging tool 102 perform measurements on the subterranean region 120. In some examples, the measurement data is communicated to the computing subsystem 110 for storage, processing, and analysis. Such data may be gathered and analyzed during drilling operations (e.g., during LWD operations), during wireline logging operations, or during other types of activities.

The computing subsystem 110 is configured to receive and analyze the measurement data from the logging tool 102 to detect properties of various subsurface layers 122 and/or other information about the wellbore 104.

As explained above, a neutron yield of the neutron generator in the logging tool 102 may decrease over time. For example, during operation of the neutron generator, the neutron generator may be operated in the wellbore 104, which may have relatively higher ambient temperatures (e.g., approximately 150° C. or greater). Degassing of the target of the neutron generator varies as a function of temperature of the target, and further heat is generated due to the focused ion beam bombarding the target because the target absorbs high-energy ions and dissipates the power as heat.

Accordingly, particularly in wellbore environments where the ambient temperatures are already relatively high and the target is further heated by absorbing high-energy ions, a neutron yield of the neutron generator may decrease over time as target degassing occurs. The decreased neutron yield may be compensated for by increasing the voltage applied to the target, but only to a certain level. For example, eventually the high-voltage value needed to maintain suitable neutron yield will exceed what is tolerable by other system electronic components, which may damage those other components, irreparably in some cases.

Figure 2:
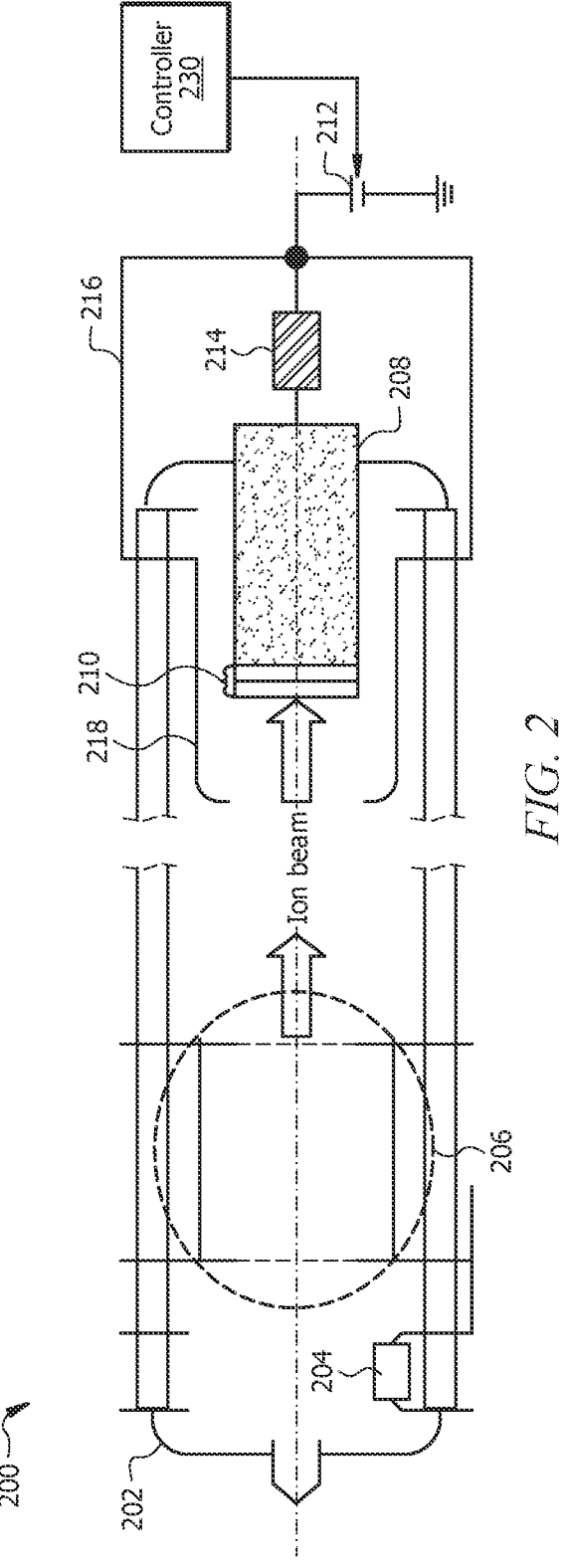
FIG. 2 is a schematic diagram of a neutron generator with a target according to an example of the present disclosure.

FIG. 2 is a diagram of a neutron generator 200 in accordance with an example of the present disclosure. As described, the neutron generator 200 may be part of a logging tool, such as the downhole logging tool 102 in FIG. 1. The logging tool 102 may include the neutron generator 200, sensors, and other hardware and software. The logging tool 102 can be deployed in a wellbore 104 and communicate with surface equipment (e.g., computing subsystem 110 of logging system 108) to process data gathered by the logging tool 102, as described above.

In some examples, the neutron generator 200 includes a housing 202. The housing 202 may be a cylindrical vacuum enclosure having glass or ceramic walls. Within the housing 202, the neutron generator 200 includes a gas reservoir 204, an ion source 206, a target rod 208, and a target 210. In some examples, a longitudinal axis of the target rod 208 is aligned with a central axis of the housing 202. The target rod 238 may be a copper target rod coupled to a voltage source 212, which may be a high voltage source external to the housing 202. The neutron generator 200 may additionally include a resistor 214 between the target rod 208 and the voltage source 212. The target rod 208 thus acts as electrical conductor to the voltage source 212, and also as a thermal conductor to transfer heat away from the target 210 (e.g., the heat that results from ion bombardment from the ion source 206).

In some examples, the voltage source 212 is also coupled to a corona shield 216, which is in turn coupled to a suppressor 218. In an example, the suppressor 218 is an electrode, which functions to accelerate the ions that are originated from the ion source 206. The corona shield 216 may be coupled outside of the housing 202, and provides a connection between the voltage source 212 and the suppressor 218. In an example, the corona shield 216 is configured to generally smooth an electrical field outside of the housing 202. The suppressor 218 is configured to provide a bias c-field, which repels secondary electrons (e.g., to direct secondary electrons back toward the target 210 and target rod 208) generated by the ion beam from the ion source 206 impacting the target 210. The suppressor 218 may also serve as a trap for backscattered ions and various sputtered particles. In an example in which the resistor 214 has a resistance of 2 MΩ, and the incident ion beam from the ion source 206 being 100 ρA, there is a voltage difference between the target rod 208/target 210 and the suppressor 218 of approximately 200 V, which may be sufficient to direct secondary low-energy electrons back toward the target 210.

In some examples, the neutron generator 200 may be operated in a pulsed neutron generating mode, with an operating duty factor of approximately 20%. In the example in which the resistor 214 has a resistance of 2 MΩ, and the peak incident ion beam from the ion source 206 being 500 μA (e.g., with an average of 100 μA considering the 20% duty factor), there is a voltage difference between the target rod 208/target 210 and the suppressor 218 of approximately 1000 V, which may be sufficient to direct secondary low-energy electrons back toward the target 210.

In some examples, the target 210 may be positioned on a surface of the target rod 208 that faces the ion source 206. The target 210 may be a metal foil layer on the surface of the target rod 208, such as a titanium foil layer, a zirconium foil layer, a scandium foil layer, and the like. In one particular example, the target 210 is a titanium foil layer 210. However, the scope of this disclosure is not intended to be limited to a certain material type for the target 210 unless explicitly stated. Accordingly, an ion beam generated by the ion source 206 may be incident on the target 210.

In an example in which the target 210 is a titanium foil layer 210, the titanium layer 210 provides an efficient diffusion barrier for hydrogen, such that the $D_2$ and $T_2$ gas in the titanium layer 210 does not tend to drift through the interface from the titanium layer 210 and into the target rod 208, and thus does not deplete the gas loaded in the titanium layer 210.

In an example, the gas reservoir 204 and the target rod 208 are positioned at opposite ends of the housing 202. The gas reservoir 204 may be pre-filled with deuterium and tritium gas and may be placed in proximity to the ion source 206. In addition, the target 210 may be loaded with the same gas according to the examples described herein. In various examples, the ion source 206 is configured to generate an ion beam of D and T atomic and molecular ions that pass through an opening of the suppressor 218 and are thus incident on the target 210. Upon reaching the target 210. D-T or T-D fusion reactions occur responsive to the high voltage provided by the voltage source 212, which generates neutrons.

In some examples, the neutron generator 200 may be operated in a CW mode with the ion beam from the ion source 206 being a DC current.

In some examples, the neutron generator 200 may be operated in a pulsed neutron generation mode, with the ion beam from the ion source 206 being pulsed, which results in neutrons also being generated in pulses. This may be useful for applications in which fast neutron inelastic scattering and delayed thermal neutron capture are isolated in different timing windows, such as to provide additional information for earthen formation evaluation. The neutron pulses may have durations on the order of 10 to 80 μsec, and have an idle time between pulses on the order of 50 to 1000 μsec. However, examples of this disclosure should not be limited to a particular duration of pulses or time between pulses in the pulsed mode unless specifically noted.

In accordance with the examples described herein, a controller 230 is coupled to or integrated with the neutron generator 200. The controller 230 is configured to operate the neutron generator 200 in a loading mode, and to operate the neutron generator 200 in a generating mode. In particular, the controller 230 is coupled to the voltage source 212. The controller 230 is configured to cause the voltage source 212 to provide a first voltage in the loading mode, and is configured to cause the voltage source 212 to provide a second voltage in the generating mode, where the second voltage is greater than the first voltage. For example, the first voltage may be on the order of 10-50 kilovolts (kV) while the second voltage is on the order of 60-130 kV. The effects of the controller 230 causing the voltage source 212 to provide the first, relatively lower voltage to the target rod 208 in the loading mode are described in further detail below.

As described above, the target 210 may be initially loaded (e.g., before being deployed in wellbore 104) or may be reloaded during a scheduled maintenance service, which increases the D/T gas content of the target 210. Regardless of whether the target 210 is being loaded initially, or reloaded during a maintenance service, target 210 gas loading using a focused ion beam from the ion source 206 may result in the target 210 not being loaded to a full saturation level of D/t gas. For example, because implementing beam controlling optics in compact neutron generators 200 is difficult, the ion beam is typically focused by the high-voltage voltage source 212 that is coupled to the target rod 208. For example, the voltage source 212 may provide approximately 60-130 kV to the target rod 208 in order to accelerate ions from ion source 206 to the target 210 with sufficient energy to cause D-T or T-D fusion reaction to occur, which generates neutrons.

Figure 3:
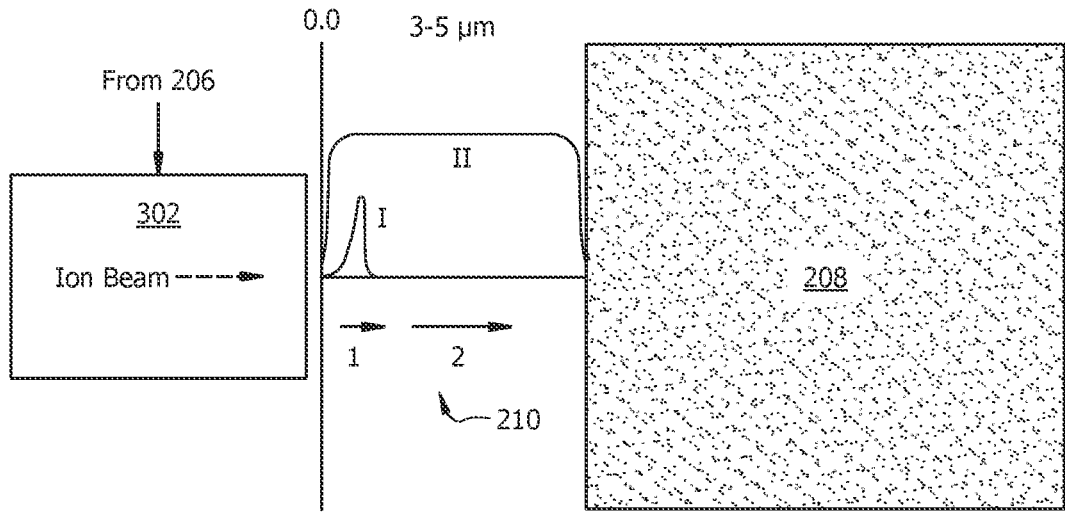
FIG. 3 is a schematic diagram illustrating loading a target of a neutron generator with an ion beam.

FIG. 3 is a schematic diagram illustrating loading the target 210 of neutron generator 200 with a focused ion beam 302, such as from the ion source 206. In FIG. 3, the target 210 is approximately 3-5 micrometers (μm) thick, and may have a diameter on the order of 8 millimeters (mm). The target rod 208 provides physical support for the target 210, and thus has a diameter that is approximately the same as that of the target 210. The thickness, or longitudinal dimension of the target rod 208 may be on the order of several centimeters (cm) or more. Generally, however, the scope of this disclosure is not intended to be limited to particular dimensions of either the target 210 and/or the target rod 208 unless explicitly stated.

In FIG. 3, the target 210 is loaded in two general steps, or phases, represented by the Arabic numbers 1 and 2. In step 1, ions from the ion beam 302 bombard the target 210 and lose energy as those ions penetrate the target material and are neutralized by gaining electrons, which causes these neutralized atoms and molecules to "stop" at a relatively shallow depth. The probability distribution curve indicated by the Roman numeral I is an example of expected depths (e.g., into the target 210) achieved by the neutralized atomic and molecular ions during step 1.

In step 2, the neutralized atoms and molecules will continue to thermally diffuse and subsequently saturate through the thickness of the target 210 due to their kinetic energy. The probability distribution curve indicated by the Roman numeral II is an example of expected depths (e.g., into the entirety of target 210) achieved by the neutralized atoms and molecules during step 2.

Figure 4:
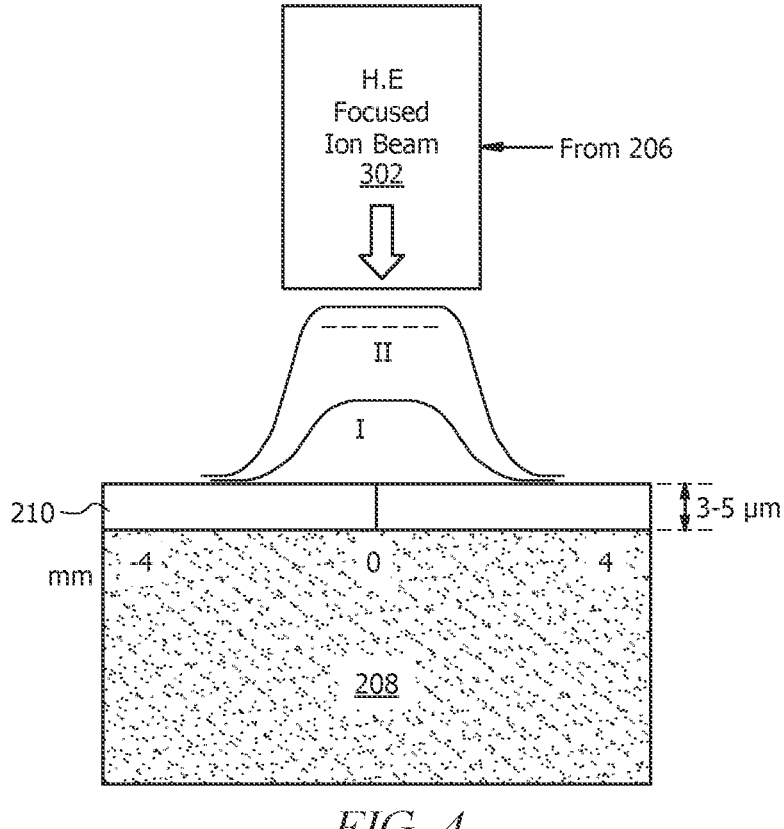
FIG. 4 is a schematic diagram illustrating loading a target of a neutron generator with an ion beam, including a distribution curve of the ion beam intensity.

FIG. 4 is a schematic diagram illustrating another view of loading the target 210 of neutron generator 200 with the focused ion beam 302 of FIG. 3, and including a distribution curve of the ion beam 302 intensity. As described above, the focused ion beam 302 that results from relatively higher voltages (e.g., 60-130 kV in some examples) typically has a circular spot with a Gaussian-like intensity distribution, which is represented by the beam intensity distribution curve indicated by the Roman numeral I, in which the center of the ion beam 302 has a higher intensity, while the outer portions of the ion beam 302 have lower intensities that decrease to the edge of the ion beam 302.

For example, in FIG. 4, similar to as above in FIG. 3, the focused ion beam 302 is incident on the target 210, and has a diameter (e.g., a beam spot) on the target 210 that is approximately 3 mm in diameter, indicated by beam intensity distribution curve I. However, the target 210 is approximately 8 mm in diameter as explained above. The neutralized atoms and molecules subsequently saturate the central region of the target 210, which is represented by the density distribution curve indicated by the Roman numeral II. Accordingly, the thermal diffusion (e.g., in step 2 described above with respect to FIG. 3) radially broadens the distribution of neutralized atoms and molecules in the target 210, as indicated by the tails in the density distribution curve II. However, outside of the area on which the high-energy ion beam 302 is focused, the target 210 is not fully saturated. Also, the dashed line in the density distribution curve II indicates a further potential deficit in D/T saturation due to local heating of the target in the area on which the ion beam 302 is focused, which may limit saturation due to thermal degassing as described above.

As a result, the target 210 is primarily loaded in the area upon which the ion beam 302 is incident, which results in a non-uniform loading of the target 210, with the target 210 potentially being loaded to a sub-saturation level. A target 210 that is not fully saturated (e.g., is loaded to a sub-saturation level) may result in shorter periods between maintenance, lower neutron yield, or both, which increases the cost of operating a neutron generator 200.

Accordingly, the examples described herein include operating the neutron generator 200 in a loading mode in order to load the target 210 with D/T gas to a particular saturation level (e.g., fully saturated). In the loading mode, ionizable gas (e.g., D/T gas) is ionized within the ion source 206 of the neutron generator 200, and the resulting ions are accelerated toward the target 210 by providing a first, relatively lower voltage to the target rod 208 that supports the target 210. A first relatively lower-energy, defocused ion beam of the accelerated ions thus bombards the target 210 and begins loading the target 210 with D/f gas. As described above, the first ion beam is defocused relative to a second ion beam (e.g., the ion beam 302 in FIGS. 3 and 4) that is created in the generating mode.

Figure 5:
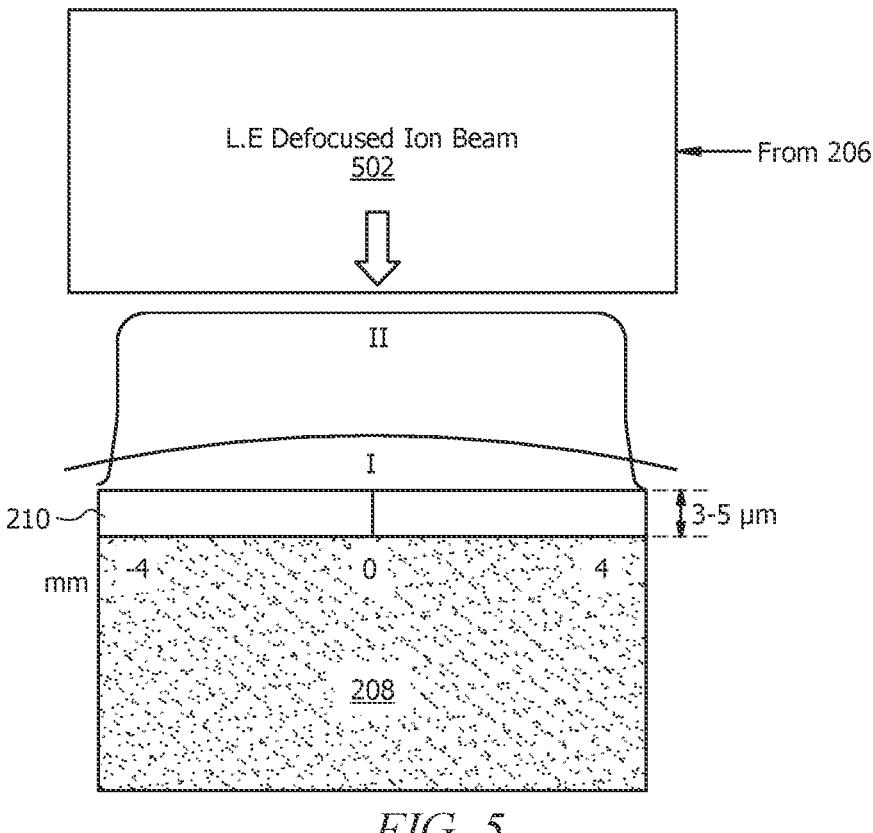
FIG. 5 is a schematic diagram illustrating loading a target of a neutron generator with a defocused ion beam according to an example of the present disclosure.

FIG. 5 is a schematic diagram illustrating loading the target 210 of neutron generator 200 with a defocused ion beam 502 (e.g., in a loading mode of the neutron generator 200) according to an example of the present disclosure. For example, as explained above, the defocused ion beam 502 shown in FIG. 5 is a first ion beam, and is defocused relative to a second ion beam used in a generating mode of the neutron generator 200 (e.g., the ion beam 302 in FIGS. 3 and 4).

As described above, the defocused ion beam 502 may result from relatively lower voltages (e.g., 10-50 kV in some examples) being applied to the target rod 208 by the voltage source 212. For example, the controller 230 causing the voltage source 212 to provide the relatively lower voltage to the target rod 208 results in an increased number of charge exchange collisions of ions in the ion beam 502, which in turn defocuses the ion beam 502 relative to the more focused ion beam 302 that results from relatively higher voltages being applied to the target rod 208. The defocused ion beam 502 is also more widely distributed on the target 210 surface. In some examples, the defocused ion beam 502 is incident on at least about 80% of the surface area of the target 210, while in other examples, the defocused ion beam 502 is incident on substantially all of the surface area of the target.

In the example of FIG. 5, the defocused ion beam 502 has a beam spot that is actually slightly larger than the target 210 diameter of 8 mm. For example, in FIG. 5, the intensity distribution of the defocused ion beam 502 is represented by the beam intensity distribution curve indicated by the Roman numeral I. Regardless of the particular dimensionality of the beam distribution curve I, the intensity distribution of the defocused ion beam 502 is larger in surface area than that of the focused ion beam 302. Further, with the defocused ion beam 502, neutralized atoms and molecules subsequently saturate substantially all of the target 210 (e.g., across its 8 mm exemplary diameter and through its exemplary 3-5 μm thickness), which is represented by the density distribution curve indicated by the Roman numeral II.

Accordingly, the thermal diffusion (e.g., in step 2 described above with respect to FIG. 3) broadens the distribution of neutralized atoms and molecules in the target 210, as indicated by the density distribution curve II, axially across the entire target 210, and to the target 210 thickness of 3-5 μm.

Referring back to FIG. 2, the controller 230 is configured to cause the voltage source 212 to provide a first voltage in the loading mode of the neutron generator 200, and is configured to cause the voltage source 212 to provide a second voltage in the generating mode of the neutron generator 200, where the second voltage is greater than the first voltage. As described, the first voltage may be on the order of 10-50 kV while the second voltage is on the order of 60-130 kV.

The controller 230 causing the voltage source 212 to provide the first, relatively lower voltage to the target rod 208 in the loading mode results in a defocused ion beam 502, which may be incident on substantially all of a surface area of the target 210, or at least about 80% of the surface area of the target 210. Accordingly, the target 210 is more evenly loaded when the controller 230 controls the voltage source 212 in the loading mode, and the target 210 is also more likely loaded to a full saturation of D/T gas. As described above, a target 210 that is more fully saturated (e.g., is loaded to a D/T gas saturation level) may result in more stability in operation, longer periods between maintenance, greater neutron yield, or both, which increases the neutron generator 200 performance while decreasing the cost of operating the neutron generator 200.

Figure 6:
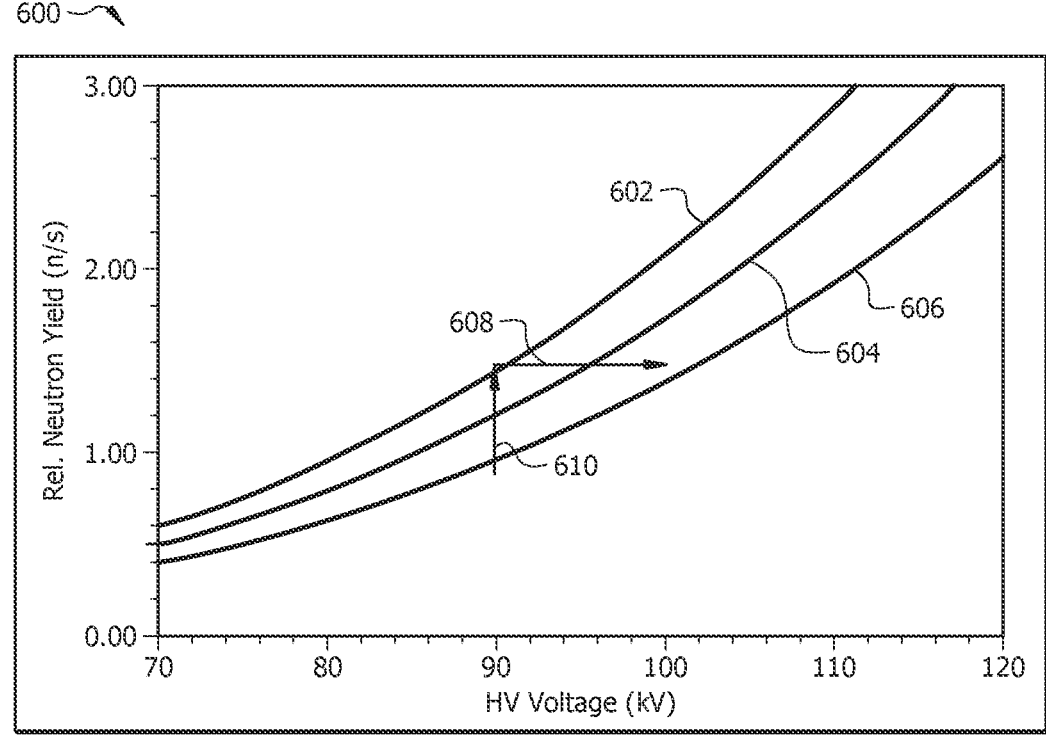
FIG. 6 is a graph of neutron yield from a target as a function of an applied voltage, and for different target gas saturations.

FIG. 6 is a graph 600 of relative neutron yield (in arbitrary units of neutrons per second) from a target 210 as a function of an applied voltage (e.g., from the voltage source 212 in kV), and for different target gas saturations. For example, the curve 602 represents a target 210 gas saturation of 1.8:1 (e.g., 0.9 D+0.9 T per atom of Ti); the curve 604 represents a target 210 gas saturation of 1.5:1 (e.g., 0.75 D+0.75 T per atom of Ti); and the curve 606 represents a target 210 gas saturation of 1.2:1 (e.g., 0.6 D+0.6 T per atom of Ti). A constant ion beam current of 70 microamps (μA) is assumed for the curves 602, 604, 606.

As the target 210 degasses over time, the neutron yield will decrease over time, such as from curve 602, to curve 604, to curve 606. Accordingly, in order to maintain a same neutron yield as the target 210 degasses, a correspondingly higher voltage should be applied by the voltage source 212. For example, assuming an initial applied voltage of 90 kV to achieve the desired neutron yield when the target 210 generates neutrons according to the curve 602, the arrow 608 represents the increase in voltage needed to maintain the desired neutron yield as the target 210 curve shifts from curve 602 to curve 604, and then to curve 606.

As described above, the target 210 may be reloaded during a scheduled maintenance service, which increases the D/T gas content of the target 210. In examples of this description, the neutron generator 200 is operated in the loading mode described above, which more evenly loads the target 210 to more complete D/T gas saturation. During the reloading/maintenance service, the target 210 gas saturation level can be restored from 1.2:1 to 1.8:1, for example. That is, the target 210 can be restored from yielding neutrons according to curve 606, to yielding neutrons according to curve 602. The arrow 610 indicates the increase in neutron yield from the target 210, at an assumed voltage of 90 kV, after such a reloading/maintenance service using the defocused ion beam 502 as described above.

The reloading/maintenance service described herein addresses the foregoing problems of the target 210 degassing during operation, which resets neutron generator 200 performance to its initial (e.g., when first deployed) state. Such reloading/maintenance service thus also may extend the life of the neutron generator 200, because the neutron generator 200 can achieve a similar neutron yield for a similar voltage from the voltage source 212 as earlier in its lifespan. Negative effects of high-voltage breakdown from causing the voltage source 212 to operate at relatively higher voltages (e.g., closer to the limits of device tolerances) may thus be avoided.

In some examples, it may be determined that a neutron generation value of the neutron generator 200 is less than a threshold for a particular value of the voltage provided by the voltage source 212 in the generating mode. For example, when the neutron generator 200 generates fewer neutrons for a given voltage than is indicated on the curve 606, that may indicate that the neutron generator 200 should be operated in the loading mode, such as to perform a reloading/maintenance service to restore the neutron generator 200 from yielding neutrons according to curve 606, to yielding neutrons according to curve 602. Thus, responsive to determining that the neutron generation value is less than the threshold, the neutron generator 200 may be again operated in the loading mode after being operated in the generating mode, to reload the target 210 as described above.

In other examples, it may be determined that the voltage provided by the voltage source 212 is greater than a threshold for a particular value of neutrons being generated by the neutron generator 200 in the generating mode. For example, when the neutron generator 200 requires a greater voltage than expected to generate a particular number of neutrons (e.g., than is indicated on the curve 606), that may indicate that the neutron generator 200 should be operated in the loading mode, such as to perform a reloading/maintenance service to restore the neutron generator 200 from yielding neutrons according to curve 606, to yielding neutrons according to curve 602. Thus, responsive to determining that the voltage provided by the voltage source 212 is greater than the threshold, the neutron generator 200 may be again operated in the loading mode after being operated in the generating mode, to reload the target 210 as described above.

In still other examples, it may be determined that the neutron generator 200 has operated in the generating mode for greater than a threshold amount of time. For example, a time between reloading/maintenance services may be 100 hours of operating in the generating mode, which may indicate that the neutron generator 200 should be operated in the loading mode, such as to perform a reloading/maintenance service to restore the neutron generator 200 from yielding neutrons according to curve 606, to yielding neutrons according to curve 602. Thus, responsive to determining that the amount of time operating in the generating mode is greater than the threshold, the neutron generator 200 may be again operated in the loading mode after being operated in the generating mode, to reload the target 210 as described above.

Further, when operating the neutron generator 200 in the loading mode (either as initial loading of the target 210, or during reloading/maintenance service of the target 210), it may be determined to stop operating in the loading mode responsive to determining that the neutron generation value for the neutron generator 200 is greater than a threshold for a particular value of the voltage provided by the voltage source 212. For example, when the neutron generator 200 generates sufficient neutrons for a given voltage, such as is indicated on the curve 602, that may indicate that the target is sufficiently loaded (e.g., saturated) and thus the neutron generator 200 loading procedure is complete. The neutron generator 200 may subsequently be operated in the generating mode.

Figure 7:
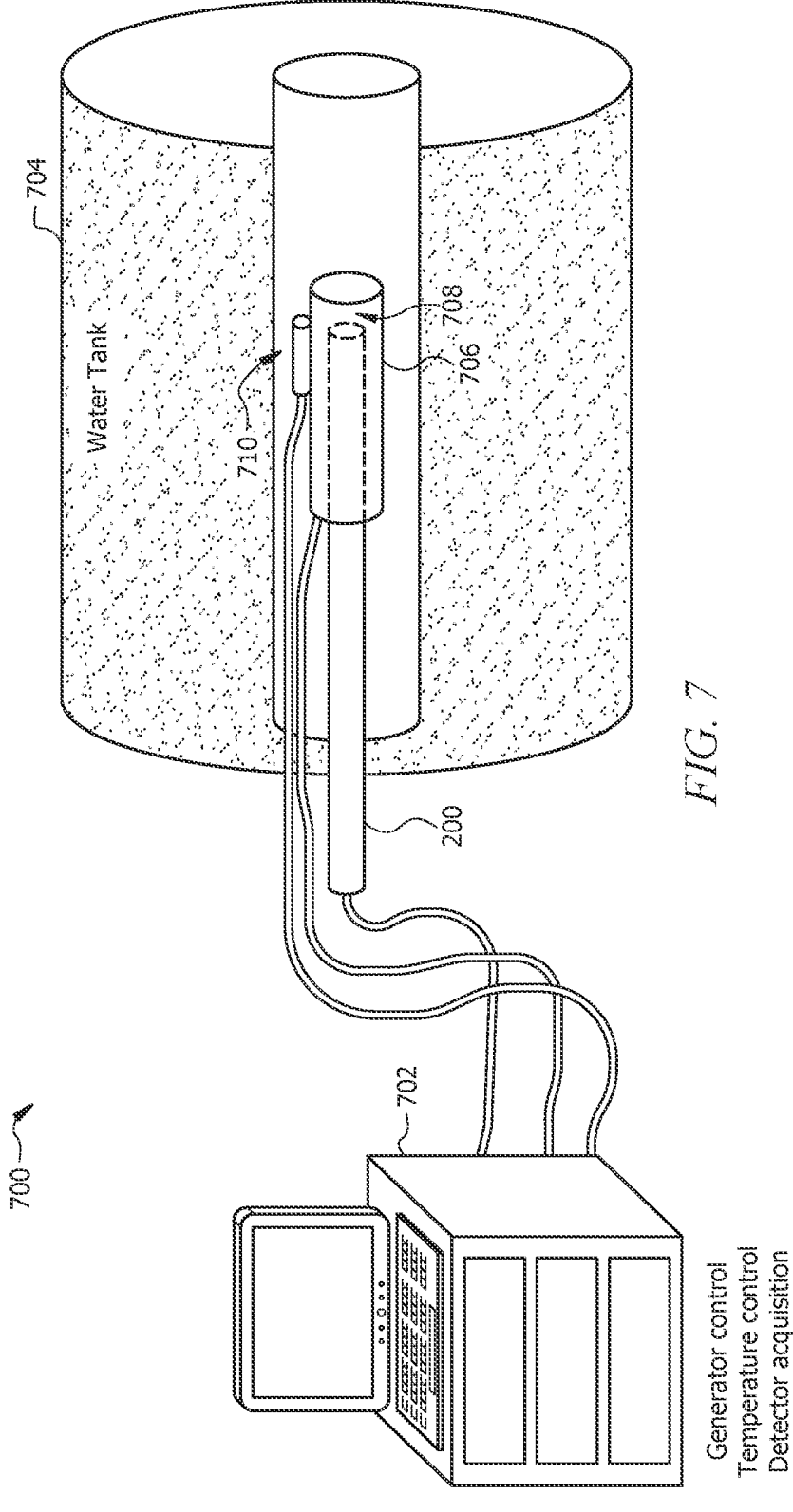
FIG. 7 is a schematic illustration of a neutron generator maintenance system according to an example of the present disclosure.

FIG. 7 is a schematic illustration of a neutron generator maintenance system 700 according to an example of the present disclosure. The maintenance system 700 is generally configured to assist or enable maintenance service of the neutron generator 200, as described above. For example, the maintenance system 700 includes a control and acquisition computer 702, a water tank 704, a heating sleeve 706, and neutron monitors 708, 710.

The computer 702 to is configured to control the operation of the neutron generator 200, such as by controlling the voltage provided by the voltage source 212, as described above. The computer 702 is also configured to receive data indicative of a number of neutrons sensed from the monitors 708, 710. The neutron monitors 708, 710 may be plastic scintillators, diamond detectors, or other types of neutron monitors known in the arts. The neutron monitors 708, 710 are reference fast neutron monitors that are configured to quantify neutron yields from the neutron generator 200, such as before and after a maintenance service is performed. Accordingly, the computer 702 is aware of both the voltage provided by the voltage source 212 of the neutron generator 200, as well as a resulting number of neutrons generated by the neutron generator 200 in response to that voltage based on data received from the neutron monitors 708, 710.

The water tank 704 is configured to have a through hole in the center, simulating a wellbore environment, for placement of the neutron generator 200, a heating sleeve 706, and neutron monitors 708, 710. The water tank 704 is configured to be filled with water, in a sufficient amount surrounding the neutron generator 200, which both slows down fast neutrons generated by the neutron generator 200, and also captures such slowed-down neutrons within, which provides a radiation safe environment for operation of the neutron generator 200 during reloading/maintenance services.

The heating sleeve 706 at least partially envelops the neutron generator 200 when the neutron generator 200 is positioned in the maintenance system 700. The heating sleeve 706 is also controllable by the computer 702, and may be useful to mimic or otherwise simulate the thermal environment of the wellbore described above. For example, the computer 702 may control the heating sleeve 706 to provide a thermal environment for the neutron generator 200 in a range of about 150° C. to 200° C. Thus, the neutron generator 200 may be tested by the maintenance system 700 to determine an operating point of the neutron generator 200, such as those described above with respect to FIG. 6.

As described above, the computer 702 may determine that the neutron generation value of the neutron generator 200 is less than a threshold for the voltage being provided in the generating mode. For example, when the computer 702 determines that the neutron generator 200 generates fewer neutrons for the provided voltage than is indicated on the curve 606, that may indicate that the neutron generator 200 should be operated in the loading mode, such as to perform a reloading/maintenance service to restore the neutron generator 200 from yielding neutrons according to curve 606, to yielding neutrons according to curve 602. Thus, responsive to determining that the neutron generation value is less than the threshold, the computer 702 may control the neutron generator 200 to operate in the loading mode after being operated in the generating mode, to reload the target 210 as described above.

Also, the computer 702 may determine that the provided voltage is greater than a threshold for the detected number of neutrons generated by the neutron generator 200 in the generating mode. For example, when the computer 702 determines that the neutron generator 200 requires a greater voltage than expected to generate a particular number of neutrons (e.g., than is indicated on the curve 606), that may indicate that the neutron generator 200 should be operated in the loading mode, such as to perform a reloading/maintenance service to restore the neutron generator 200 from yielding neutrons according to curve 606, to yielding neutrons according to curve 602. Thus, responsive to determining that the voltage provided by the voltage source 212 is greater than the threshold, the computer 702 may control the neutron generator 200 to operate in the loading mode after being operated in the generating mode, to reload the target 210 as described above.

Further, the computer 702 may determine to stop operating the neutron generator 200 in the loading mode responsive to determining that the neutron generation value for the neutron generator 200 is greater than a threshold for the provided voltage. For example, when the computer 702 determines that the neutron generator 200 generates sufficient neutrons for a given voltage, such as is indicated on the curve 602, that may indicate that the target 210 is sufficiently loaded (e.g., saturated) and thus the neutron generator 200 loading procedure is complete. The neutron generator 200 may then be subsequently deployed or re-deployed to the field to operate in the generating mode.

Figure 8:
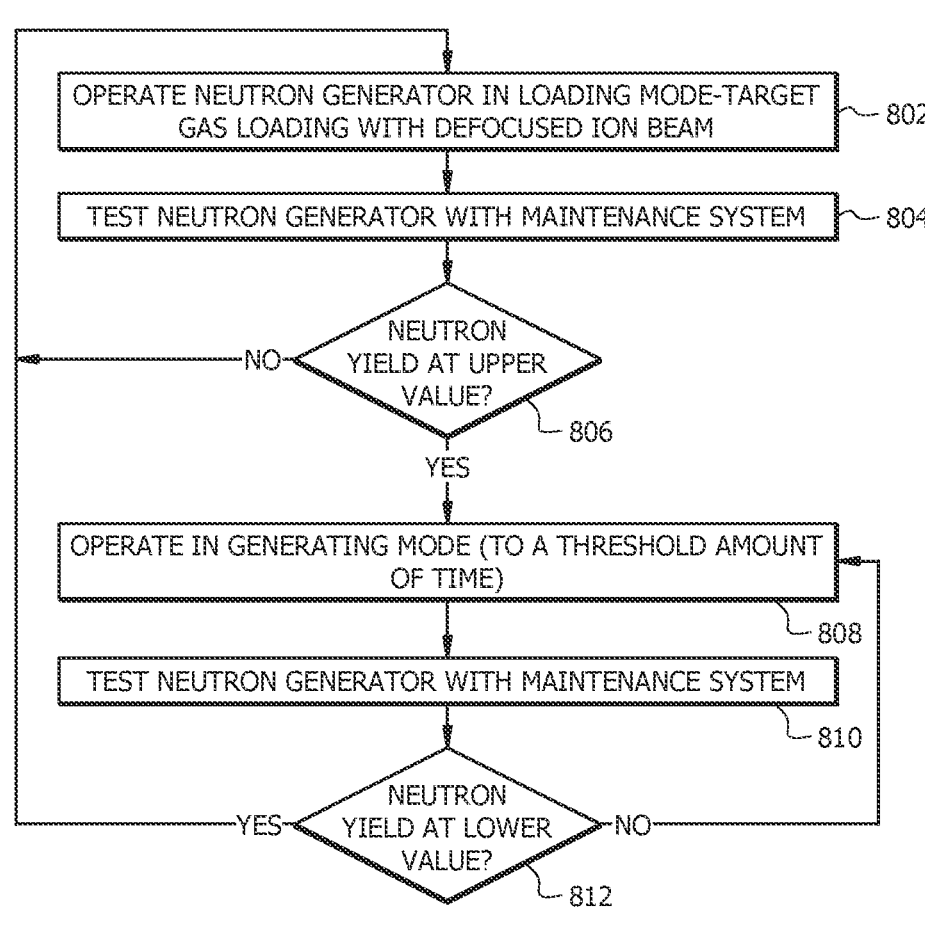
FIG. 8 is a flow chart of a method according to the present disclosure.

FIG. 8 is a flow chart of a method 800 according to the present disclosure. The method 800 begins in block 802 with operating the neutron generator 200 in the loading mode, in which the target 210 is loaded with ionizable gas (e.g., D/T gas) using a defocused ion beam. As described above, the defocused ion beam 502 may result from relatively lower voltages (e.g., 10-50 kV in some examples) being applied to the target rod 208 by the voltage source 212.

The method 800 continues in block 804 with testing the neutron generator 200, such as by using the maintenance system 700 described above, to determine a neutron yield of the neutron generator 200. The method 800 then continues in block 806 with determining whether the neutron yield of the neutron generator 200 is at an upper threshold or value. Determining whether the neutron yield is at the upper threshold may be as described above with respect to FIG. 6.

If the neutron yield is less than the upper value in block 806, the method 800 continues back to block 802 and the neutron generator 200 is again operated in the loading mode, which may increase the D/T saturation of the target 210. If the neutron yield is greater than the upper threshold in block 806, the method 800 continues to block 808 with operating the neutron generator 200 in the generating mode. For example, the neutron generator 200 may be deployed or redeployed into a wellbore environment, and provided with a second voltage that is greater than the first voltage used in the loading mode (e.g., the first voltage is on the order of 10-50 kV while the second voltage is on the order of 60-130 kV).

The neutron generator 200 may be operated in the generating mode for up to a threshold amount of time. For example, a time between reloading/maintenance services may be 100 hours of operating in the generating mode, which may indicate that the neutron generator 200 should be operated in the loading mode, such as to perform a reloading/maintenance service to restore the neutron generator 200 from a relatively lower neutron yield to a relatively higher neutron yield.

Accordingly, after operating in the generating mode in block 808 for the threshold amount of time (e.g., 100 hours), the method 800 continues to block 810 in which the neutron generator 200 is again tested as in block 804. The method 800 then continues in block 812 with determining whether the neutron yield of the neutron generator 200 is at a lower threshold or value. Determining whether the neutron yield is at the lower threshold may be as described above with respect to FIG. 6.

If the neutron yield is less than the lower value in block 812, the method 800 continues back to block 802 and the neutron generator 200 is again operated in the loading mode, which may increase the D/T saturation of the target 210. If the neutron yield is still greater than the lower threshold in block 812, despite having been operated in the generating mode for the threshold amount of time in block 808, the method 800 returns to block 808 and the neutron generator 200 continues to operate in the generating mode. That is, the neutron generator 200 may then be continuously deployed or re-deployed to the field to operate in the generating mode, until the next reloading/maintenance service.

ADDITIONAL DISCLOSURE

The following are non-limiting, specific embodiments in accordance with the present disclosure:

A first embodiment, which is a method that includes operating a neutron generator in a loading mode by ionizing ionizable gas within an ion source of the neutron generator to create a plurality of ions, and accelerating the plurality of ions by providing a first voltage to a target rod that supports the target to create a first ion beam that bombards a target of the neutron generator. The method also includes operating the neutron generator in a generating mode to generate a plurality of neutrons by accelerating the plurality of ions by providing a second voltage to the target rod to create a second ion beam that bombards the target. The second voltage is greater than the first voltage.

A second embodiment, which is the method of the first embodiment, wherein the first ion beam is defocused relative to the second ion beam.

A third embodiment, which is the method of the second embodiment, wherein the first ion beam is incident on substantially all of a surface area of the target.

A fourth embodiment, which is the method of the second embodiment, wherein the first ion beam is incident on at least 80% of a surface area of the target.

A fifth embodiment, which is the method of the first embodiment, wherein the first voltage is approximately 10-50 kV, and wherein the second voltage is approximately 60-130 kV.

A sixth embodiment, which is the method of the first embodiment, further comprising: determining that a neutron generation value is less than a threshold for a particular value of the second voltage; and operating the neutron generator in the loading mode after operating the neutron generator in the generating mode responsive to determining that the neutron generation value is less than the threshold.

A seventh embodiment, which is the method of the first embodiment, further comprising: determining that the second voltage is greater than a threshold for a particular value of neutrons generated by the neutron generator; and operating the neutron generator in the loading mode after operating the neutron generator in the generating mode responsive to determining that the second voltage is greater than the threshold.

A eighth embodiment, which is the method of the first embodiment, further comprising: determining that an amount of time of operating the neutron generator in the generating mode is greater than a threshold; and operating the neutron generator in the loading mode after operating the neutron generator in the generating mode responsive to determining that the amount of time is greater than the threshold.

A ninth embodiment, which is the method of the first embodiment, further comprising stopping operating in the loading mode responsive to determining that a neutron generation value is above a threshold in the generating mode for a particular value of the second voltage.

A tenth embodiment, which is the method of the first embodiment, further comprising: deploying a logging tool including the neutron generator into a wellbore; transmitting the plurality of neutrons from the neutron generator into a formation surrounding the wellbore; and receiving a signal measurement related to the plurality of neutrons at one or more sensors in the logging tool.

An eleventh embodiment, which is a system, comprising: a neutron generator, comprising: a housing; a gas reservoir positionable within the housing; a target rod positionable within the housing and having a longitudinal axis aligned with a central axis of the housing; an ion source positionable adjacent to the gas reservoir and between the target rod and the gas reservoir, wherein the ion source is configured to create a plurality of ions; a target positionable on a surface of the target rod facing the ion source; and a voltage source coupled to the target rod. The system also comprises a controller coupled to the neutron generator, the controller configured to: operate the neutron generator in a loading mode by causing the voltage source to provide a first voltage to accelerate the plurality of ions created by the ion source to create a first ion beam that bombards the target; and operate the neutron generator in a generating mode by causing the voltage source to provide a second voltage to accelerate the plurality of ions to create a second ion beam that bombards the target. The second voltage is greater than the first voltage.

A twelfth embodiment, which is the system of the eleventh embodiment, wherein the first ion beam is defocused relative to the second ion beam.

A thirteenth embodiment, which is the system of the twelfth embodiment, wherein the first ion beam is incident on substantially all of a surface area of the target.

A fourteenth embodiment, which is the system of the twelfth embodiment, wherein the first ion beam is incident on at least 80% of a surface area of the target.

A fifteenth embodiment, which is the system of the eleventh embodiment, wherein the first voltage is approximately 10-50 kV, and wherein the second voltage is approximately 60-130 kV.

A sixteenth embodiment, which is the system of the eleventh embodiment, wherein the controller is further configured to increase the second voltage over time A seventeenth embodiment, which is the system of the eleventh embodiment, wherein the ion source includes an ionizable gas comprising at least one of deuterium gas, tritium gas, or a combination thereof.

An eighteenth embodiment, which is the system of the eleventh embodiment, wherein the ion source is operated in a pulsed mode, and neutrons are generated in pulses according to a timing sequence.

A nineteenth embodiment, which is the system of the eighteenth embodiment, wherein a duty factor of the pulsed mode is between 5-30 percent.

A twentieth embodiment, which is the system of the eighteenth embodiment, wherein a duration of each of the pulses is between 10-80 microseconds.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method, comprising:

operating a neutron generator in a loading mode by:

ionizing ionizable gas within an ion source of the neutron generator to create a plurality of ions; and accelerating the plurality of ions by providing a first voltage to a target rod that supports a target of the neutron generator to create a defocused ion beam that bombards the target, wherein the first voltage has a first value ranging from approximately 10 kilovolts (kV) to 50 kV, wherein the defocused ion beam results from an increased number of charge exchange collisions at the first voltage that scatter ion trajectories, and wherein the defocused ion beam is incident on at least 80% of a surface area of the target; and operating the neutron generator in a generating mode to generate a plurality of neutrons by accelerating the plurality of ions by providing a second voltage to the target rod to create a focused ion beam that bombards the target, wherein the second voltage is greater than the first voltage, wherein the second voltage has a second value ranging from approximately 60 kV and 130 kV, and wherein the focused ion beam is more focused than the defocused ion beam due to reduced charge exchange collisions at the second voltage compared to the first voltage.

2. The method of claim 1, further comprising:

making a determination that a neutron generation value, for a particular value of the second voltage, is less than a threshold neutron generation value; and operating the neutron generator in the loading mode after operating the neutron generator in the generating mode responsive to the determination.

3. The method of claim 1, further comprising:

making a determination that the second voltage, for a particular neutron generation value, is greater than a threshold voltage; and operating the neutron generator in the loading mode after operating the neutron generator in the generating mode responsive to the determination.

4. The method of claim 1, further comprising:

determining that an amount of time of operating the neutron generator in the generating mode is greater than a threshold; and operating the neutron generator in the loading mode after operating the neutron generator in the generating mode responsive to determining that the amount of time is greater than the threshold.

5. The method of claim 1, further comprising stopping operating in the loading mode responsive to determining that a neutron generation value, for a particular value of the first voltage, is above a threshold neutron generation value.

6. The method of claim 1, further comprising:

deploying a logging tool including the neutron generator into a wellbore;

transmitting the plurality of neutrons from the neutron generator into a formation surrounding the wellbore; and receiving a signal measurement related to the plurality of neutrons at one or more sensors in the logging tool.

7. The method of claim 1, further comprising operating the neutron generator in a pulsed mode to generate the neutrons in pulses according to a timing sequence.

8. The method of claim 7, wherein a duration of each pulse is between 10-80 microseconds.

9. The method of claim 7, wherein an idle time between the pulses is between 50 to 1000 microseconds.

10. The method of claim 7, wherein a duty factor of the pulsed mode is between 5-30 percent.

11. The method of claim 1, wherein the ionizable gas comprises deuterium gas.

12. The method of claim 1, wherein the ionizable gas comprises tritium gas.

13. The method of claim 1, wherein the target comprises a metal foil layer.

14. The method of claim 1, wherein the target comprises a titanium foil layer.

15. The method of claim 1, wherein the target comprises a zirconium foil layer.

16. The method of claim 1, wherein the target comprises a scandium foil layer.

17. The method of claim 1, wherein a diameter of the focused ion beam is smaller than a diameter of the target.

18. The method of claim 1, wherein the target has a diameter of approximately 8 millimeters and a thickness of approximately 3-5 micrometers.

19. The method of claim 18, wherein the defocused ion beam has a beam spot larger than the diameter of the target.

20. The method of claim 1, wherein operating the neutron generator in the loading mode results in the target achieving a gas saturation ratio of at least 1.5:1 of combined deuterium and tritium atoms per target metal atom.

* * * * *